United States Patent [19]
Palamara

[11] 4,429,893
[45] Feb. 7, 1984

[54] BOAT TRAILER

[76] Inventor: Anthony Palamara, 7559 Calle Granada, Anaheim, Calif. 92807

[21] Appl. No.: 365,503

[22] Filed: Apr. 5, 1982

[51] Int. Cl.³ ............................................. B60P 1/46
[52] U.S. Cl. ................................. 280/414.1; 114/344; 414/529; 414/534
[58] Field of Search ..................... 280/414.1; 414/480, 414/482, 483, 485, 486, 529, 530, 531, 532, 533, 534, 537, 535; 114/344

[56] References Cited

U.S. PATENT DOCUMENTS

| | | | |
|---|---|---|---|
| 2,723,038 | 11/1955 | Peterson | 280/414.1 |
| 2,798,625 | 7/1957 | Mamo | 414/531 |
| 2,984,498 | 5/1961 | Dewald | 280/414.1 |
| 3,031,093 | 4/1962 | Holsclaw | 414/533 |
| 3,117,683 | 1/1964 | Kleppe | 414/534 |
| 3,124,259 | 3/1964 | Goettl | 414/531 |
| 3,178,043 | 4/1965 | Easterwood | 414/532 |
| 3,390,796 | 7/1968 | Theobald | 414/479 |
| 3,447,815 | 6/1969 | West | 414/534 |
| 4,103,925 | 8/1978 | Palamara | 280/414.1 |
| 4,197,050 | 4/1980 | Larson | 414/529 |

Primary Examiner—Joseph F. Peters, Jr.
Assistant Examiner—Donn McGiehan
Attorney, Agent, or Firm—Gilbert A. Thomas

[57] ABSTRACT

A boat trailer composed of a metal frame with cross members constructed of metal box beams or I beams, a padded board parallel to the sides of the frame and located about five inches above the wheels resting on the frame, four automotive leaf springs bent 90 degrees at one end and attached to the beams of the frame with U bolts, the unattached end being tilted slightly inward and attached with bolts to padded wooden blocks which urge the boat toward the center of the trailer.

4 Claims, 4 Drawing Figures

BOAT TRAILER

BACKGROUND OF THE INVENTION

This invention relates generally to boat trailers and more specifically to a boat trailer equipped with leaf springs as supports which enable one man to guide the boat on the trailer and draw it up with a cable without entering the water.

FIELD OF THE INVENTION

With all previously invented trailers, the operator or his assistant must enter the water to draw the boat on the trailer up close to the hoist which is often engaging a hook on the front of the hull. Certain difficulties are always present.

1. The captain must aim the boat to the approximate center line of the trailer. While his skill increases with experience, the threat of damage to resilient hulls is always present.

2. Boat trailers usually contain guide rollers on the sides which may puncture the hull if wind or current move the boat into a crosswise position in respect to the trailer.

3. Boat trailers I have observed are constructed of heavy material and rollers that have as their primary purpose the safe transportation of the boat. The side rollers prevent lateral movement and maintain the boat in an upright position.

4. All boat trailers require that one or more persons enter the water to help guide the boat onto the trailer, attach the hoist to the boat, and pull the boat onto the trailer with the hoist.

DESCRIPTION OF THE PRIOR ART

Examples of the trailers invented by others are U.S. Pat. No. 2,798,625 in which the boat is carried by chocks covered with padding. U.S. Pat. No. 2,723,038 which is an improved device with pivoting support chocks. In U.S. Pat. No. 2,984,498 rollers are added to chocks to support the boat. U.S. Pat. No. 3,124,259 adds buoyant means to convert the trailer to a floating trailer and elevating means to raise the boat. Both add to complexity and cost. U.S. Pat. No. 3,390,796 has a movable frame to which the boat is loaded, supported by rollers, then the frame and boat are loaded on a transporting trailer. Springs are used by the inventor in U.S. Pat. No. 4,103,925 but are merely the upper portion of leaf spring arms and are fastened to side rails.

All of these prior devices require one person to enter the water to assist in hooking the boat to the winch, operating the winch and pulling the boat onto the trailer.

SUMMARY OF THE INVENTION

It is an object of this invention to enable one to steer the boat onto a trailer with the assistance only of padded leaf springs.

It is still another object of this invention to make unnecessary the additional other person needed as a helper in the other designs to hook the boat to the hoist and pull the boat up.

It is a further object of this invention to enable one person to move the trailer in the water, load the boat, haul it into carrying position and move the trailer out of the water, without getting his feet wet.

It is another object of this invention to accomplish the above at the lowest cost and with great simplicity.

These together with other objects and advantages which will become subsequently apparent reside in the details of construction and operation as more fully explained in the accompanying drawings and specifications.

DESCRIPTION OF THE PREFERRED EMBODIMENT

This invention is best understood if the parts are discussed first.

Figure 1:
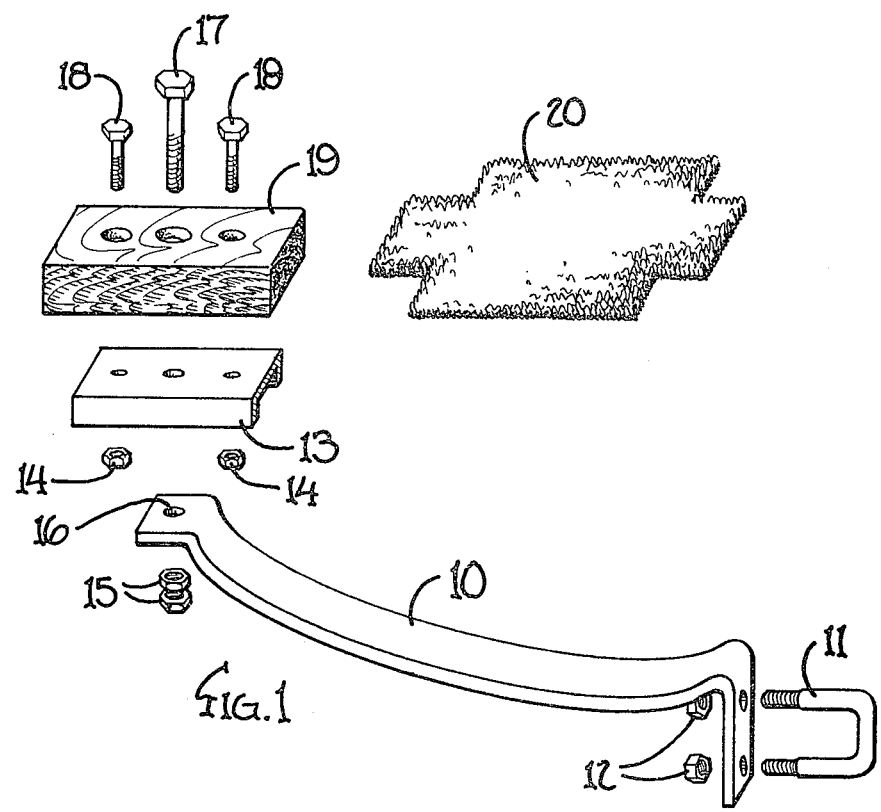
FIG. 1 is a schematic view of a leaf spring as used in this invention.

In FIG. 1, a leaf spring 10 is the base of the invention. This can flex 8–12 inches in use. It is fastened by means of a U bolt 11 and nuts 12 to the crossmember 27 and 28 of a trailer 26. The frame and crossmembers of the trailer may be construced of metal I-beams or box beams as shown.

Figure 2:
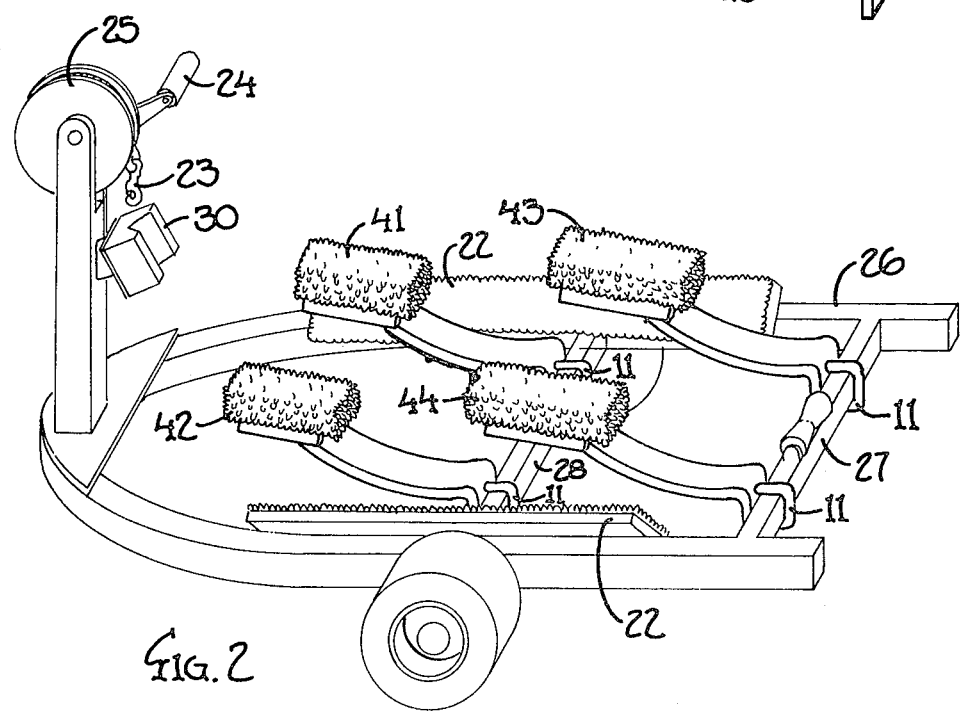
FIG. 2 is a top side view of a boat trailer with the leaf spring attached.
Figure 3:
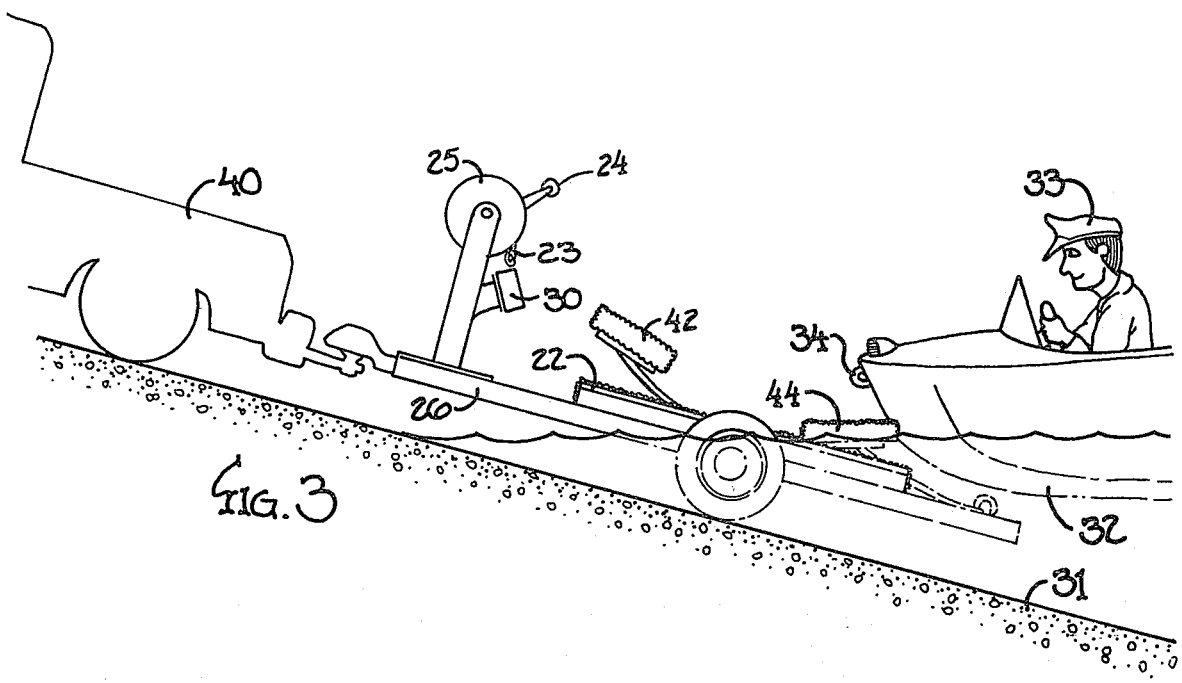
FIG. 3 is a view of the trailer in the water with the boat being steered onto the trailer, with back spring depressed and front spring extended.

FIG. 2. At the end of the spring 10 opposite the attached end, a hole is drilled 16 to accommodate a bolt 17 which attaches a piece of U-shaped metal aluminum or iron 13 and a wooden block 19. These are attached to each other by bolts 18 and nuts 14. A piece of carpet 20 whose edges are trapped between 13, the U-shaped metal, and 19, the wood block, completes the unit. Alternatively, the wood block may be covered with a thick plastic coating. Four of these units 41, 42, 43 and 44, FIG. 2, are attached to the crossmembers 27 and 28 of a trailer by means of U bolts 11 and nuts 12. Their use is unique and will be explained. Flat boards 22 padded with carpeting, a thick plastic coating or other shock absoring material are located on and parallel to the sides of the trailer 26 to cradle and shield the boat from damage.

In the position in which the boat 32 is in the water the four springs 41, 42, 43 and 44 are fully extended and upright.

As the boat 32 is driven by the operator 33 onto the trailer 26, the rear springs 43 and 44 make contact first and flex slightly as pressure is applied by the hull and at the same time resist this pressure and guide the hull into the center.

As the boat 32 glides forward, urged into the center by the operator 33, who runs the engine (not shown), the hull 32 makes contact with the second set of springs 41 and 42 depressing them and being guided to the center.

Figure 4:
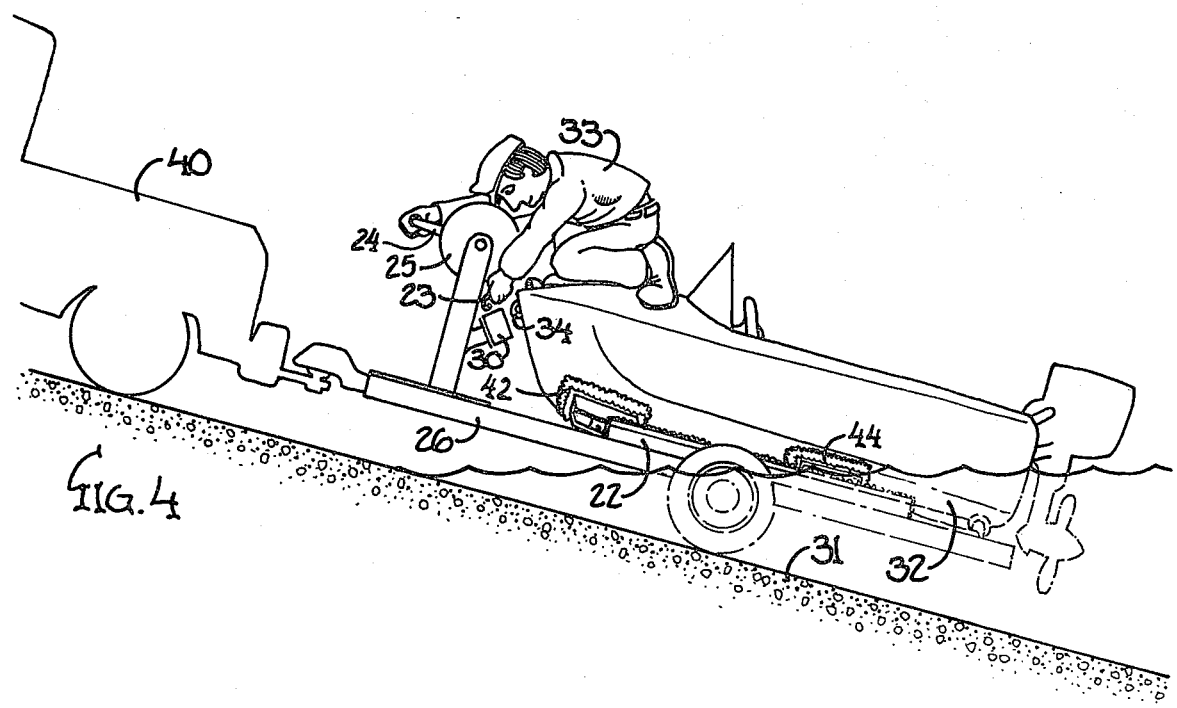
FIG. 4 is a schematic view of the boat being attached to the trailer with the leaf springs depressed.

The hull 32 can be driven y the motor of the boat up to within reaching distance of winch 25 with handle 24. The operator 33 then moves to the front of the boat and takes hook 23, FIG. 4, and attaches it to a loop 34 on the front of the boat and draws the boat upward until the center of the bow is cradled in support 30 and the boat is secure and cradled by the flat boards 22 on the sides. The operator 33 then jumps to the position of the driveway 31 that is above water and entering the vehicle 40, drives the boat 32 and trailer 26 away having not gotten wet in so doing.

The springs 41, 42, 43 and 44 are all depressed and exerting spring support onto the sides of the hull 32 of the boat.

I claim:

1. A boat trailer with cross member means, padded means located on both sides parallel to the sides of the trailer and five inches above the wheels to permit said cross member means to contain the boat hull in a final resting position, four automotive leaf springs 40 inches long, one end bent at a 90 degree angle and fastened with attachment means to the outside one-third of the cross members of the trailer, the unattached end tilted inward and attached to padded block means which interact with the boat hull urging it inward toward the center during launching and recovery, and winch means to haul the boat into final position on the trailer.

2. A boat trailer means like that described in claim 1 in which the padded means are wooden boards running the length of the trailer covered with a thick plastic coating.

3. A boat trailer like that described in claim 1 in which the attachment means are U bolts passing around the cross member means and through the leaf spring and attaching it thereto.

4. A boat trailer like that described in claim 1 in which the padded block means are plastic coated wooden blocks attached to the leaf spring.

* * * * *